United States Patent [19]

Siewerdt

[11] 4,294,504
[45] Oct. 13, 1981

[54] HIGH VOLTAGE CABLE

[75] Inventor: Lothar Siewerdt, Eggenstein-Leopoldshafen, Fed. Rep. of Germany

[73] Assignee: Kernforschungszentrum Karlsruhe GmbH, Karlsruhe, Fed. Rep. of Germany

[21] Appl. No.: 57,373

[22] Filed: Jul. 13, 1979

[30] Foreign Application Priority Data

Jul. 13, 1978 [DE] Fed. Rep. of Germany ....... 2830736

[51] Int. Cl.³ ...................... H01R 15/12; H01B 11/18
[52] U.S. Cl. ............................. 339/132 R; 174/103; 174/107; 174/116
[58] Field of Search ........... 339/177 R, 177 E, 218 R, 339/132 R; 174/15 CA, 102 R, 103, 107, 115, 116

[56] References Cited

U.S. PATENT DOCUMENTS

| 240,108 | 4/1881 | Eaton | 174/116 |
|---|---|---|---|
| 711,414 | 10/1902 | Borel | 174/103 |
| 2,075,073 | 3/1937 | Watson | 174/103 |
| 2,186,441 | 1/1940 | Youmans | 174/102 R |
| 2,449,073 | 9/1948 | Johannesen | 339/177 R |
| 2,892,007 | 6/1959 | Rickards | 174/102 R |
| 3,275,839 | 9/1966 | Bartik | 174/102 R |
| 3,458,852 | 7/1969 | Higgins, Jr. | 339/177 R |
| 3,843,831 | 10/1974 | Hutchison et al. | 174/116 |

FOREIGN PATENT DOCUMENTS

| 112540 | 3/1929 | Austria | 174/103 |
|---|---|---|---|
| 604827 | 7/1948 | United Kingdom | 174/116 |

Primary Examiner—Neil Abrams
Attorney, Agent, or Firm—Spencer & Kaye

[57] ABSTRACT

A high voltage cable wherein each conductive element comprises a flexible inner conductor, an insulating sheath within which the inner conductor moves freely, a flexible outer conductor encasing the insulating sheath and an insulating jacket which encases the outer and inner conductors. The cable may consist of one conductive element or a plurality of conductive elements distributed symmetrically in groups over a circular cross-sectional area.

7 Claims, 5 Drawing Figures

HIGH VOLTAGE CABLE

BACKGROUND OF THE INVENTION

The present invention relates to a high voltage cable and in particular, to a high voltage cable and support structure for use in transmitting current pulses at low temperatures.

In cables used to feed pulsed currents at high voltages into superconducting switches, it is found that the conductors tend to separate mechanically from the dielectric. This occurs because the materials used for conduction and insulation in the assembly of the cable have different coefficients of thermal expansion in the low temperature range at which superconducting switches operate. The resulting cavities produce a considerable increase in partial discharges and, particularly in the presence of helium gas, may lead to electrical breakdowns and premature destruction of the cable.

One approach to solving this problem is to use individual cables having insulation which consists of a wound plastic tape. This arrangement compensates for differences in longitudinal expansion due to changes in temperature. However, multipole arrangements in which the individual cables are arranged in a predetermined pattern must be cast into a compact unit as, for example, with superconductive switches wherein the switching circuit inductances must be substantially identical. Since the casting resin and the plastic winding tape have different coefficients of thermal expansion and the plastic winding tape shrinks more during cooling than the casting resin, cavities nevertheless appear in the dielectric material.

It is an object of the present invention to develop a multipole high voltage cable for the transmission of pulsed currents in the kiloampere range which has a high electrical stability even under repeated changes in temperature in the range from 4° K. to 300° K.

SUMMARY OF THE INVENTION

In the present invention, a high voltage cable is provided wherein each conductive element comprises a flexible inner conductor, an insulating sheath within which the inner conductor moves freely, a flexible outer conductor encasing the insulating sheath and an insulating jacket which encases the outer and inner conductors. The cable may consist of one conductive element or a plurality of conductive elements distributed symmetrically in groups over a circular cross-sectional area. When a plurality of conductive elements are employed, glass tape is placed between the conductive elements in each group and glass fiber reinforced filler in the interstices between the groups of conductive elements. A glass tape wrap is also used to enclose the groups of conductive elements and a shield surrounds this glass tape wrap.

An advantage of the invention is that cavities do not occur in the insulating material body of a multipole cable having a predetermined pattern of conductors and a high electrical and thermal sudden load factor which operates in a temperature range between 4° K and 300° K. Also, gas bubbles are not formed in the insulating jacket and malfunctions caused by breaking or burning of a conductor can easily be repaired by replacing the conductor. The cable may be used to transmit current pulses on the order of 10 kiloamperes for several milliseconds at very low temperature.

DESCRIPTION OF THE PREFERRED EMBODIMENT

Figure 1:
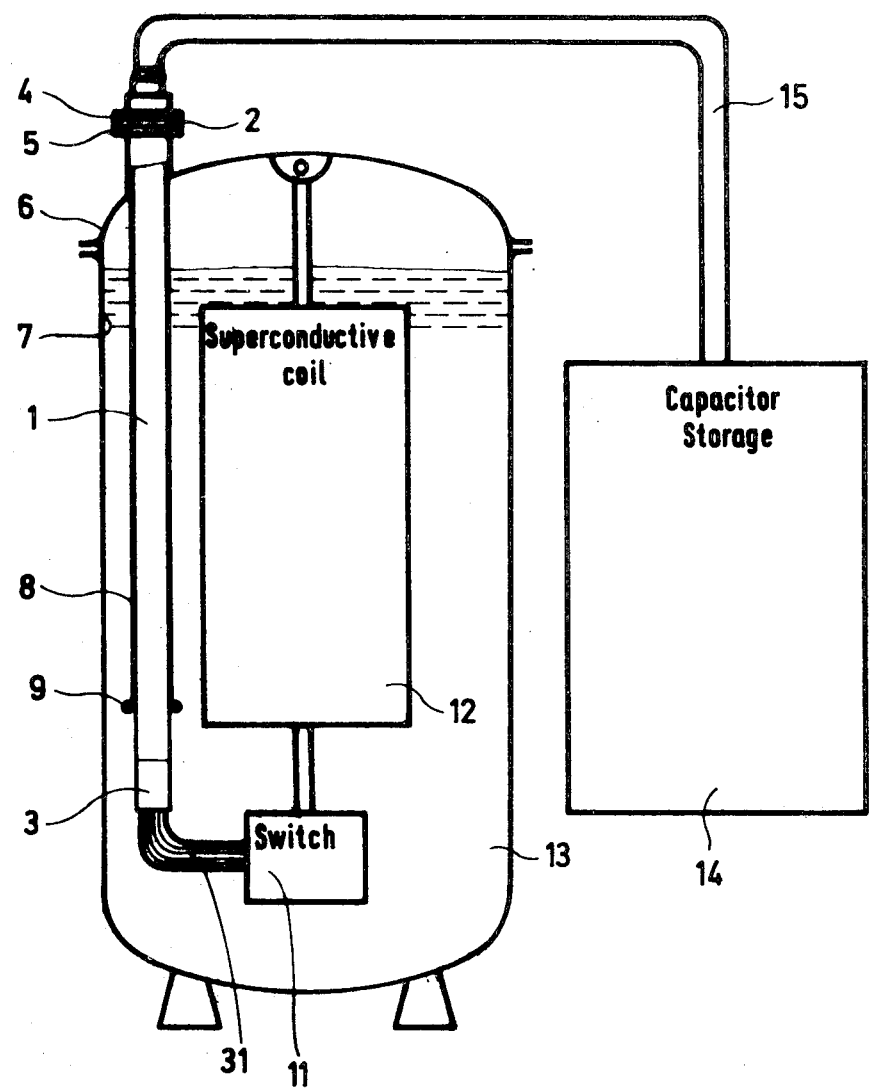
FIG. 1 shows a system including a high tension cable for operating the switching coil of a superconducting energy storage device.

Referring to FIG. 1 there is shown a schematic diagram of a low temperature system employing the high voltage cable of the present invention. The high voltage cable 1 is terminated at its upper end by a plug-in coupling 2 and at its lower end by a terminating closure 3. The cable is connected through the flange 4 of the plug-in coupling 2 to the flange 5 of the cover 6 of a cryostat 7. The length of the high voltage cable 1 is about 3.50 m, the cable being freely suspended in the cryostat 7. A shield 8 of aluminum tape applied to the outside of the cable prevents pick up of high frequency interference signals. Above the terminating closure 3, the grounded shield 8 is conductively connected to a control electrode 9.

The individual conductors 31 of the high voltage cable 1 brought out of the terminating closure 3 are connected to a superconducting switch 11 which switches a superconductive coil 12 for the storage of electromagnetic energy. The cryostat 7 is filled with liquid helium 13. The surge currents to actuate the superconductive switch 11 are obtained from a bank of capacitors 14 connected to the plug-in coupling via a high tension cable 15 which is maintained at room temperature. The cryostat 7, superconducting switch 11, superconducting coil 12 and capacitor storage are known in the art and do not form a part of the present invention.

Figure 2:
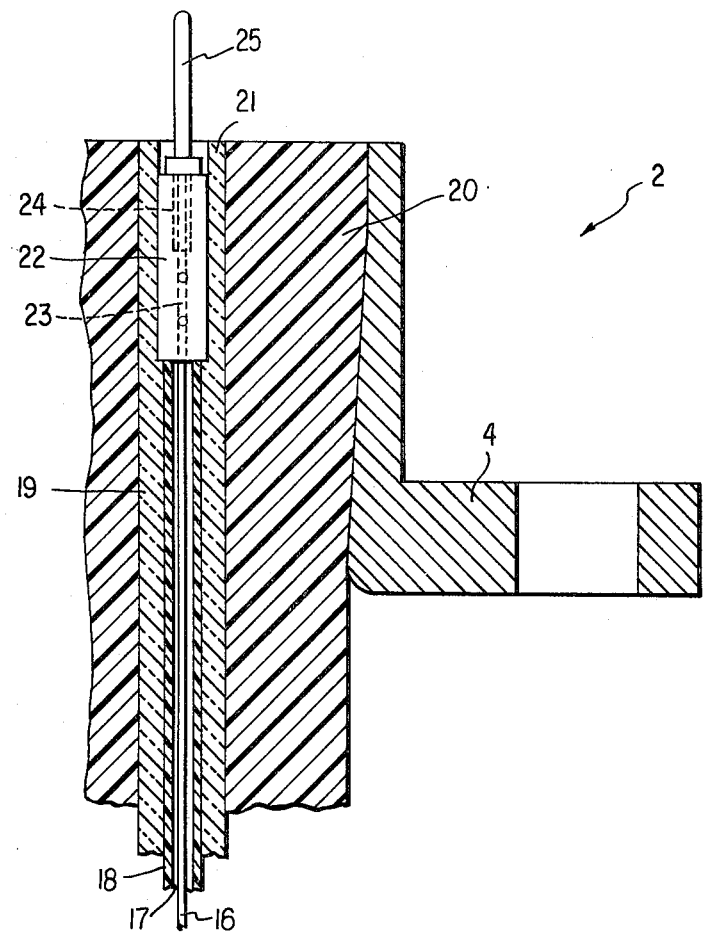
FIG. 2 illustrates a plug-in coupling used in the system of FIG. 1.

The basic structure of the high voltage cable 1 in the vicinity of the cryostat 7 and the configuration of the plug-in connection 2 are shown in the sectional symmetrical half-view of FIG. 2. A flexible copper conductor having a cross-sectional area of 3.5 mm$^2$ forms the inner conductor 16. Conductor 16 is enclosed by an insulating tube or sheath 17 made of Polyamid (PA) having an inner diameter of 4 mm and an outer diameter of 6 mm. An outer conductor 18 made of a diagonally woven tubular fabric of copper and having a cross-sectional area which is small compared to that of conductor 16 is applied to the outside of sheath 17. The outer diameter of the outer conductor 18 is about 6.4 mm. A glass tape 19 is wound around the outer conductor 18 and sheath 17, resulting in an outer overall diameter of 14 mm.

In the illustrated embodiment, nine such glass tape wraps are encased in a cast resin block 20 and connected by means of the flange 4.

Figure 2A:
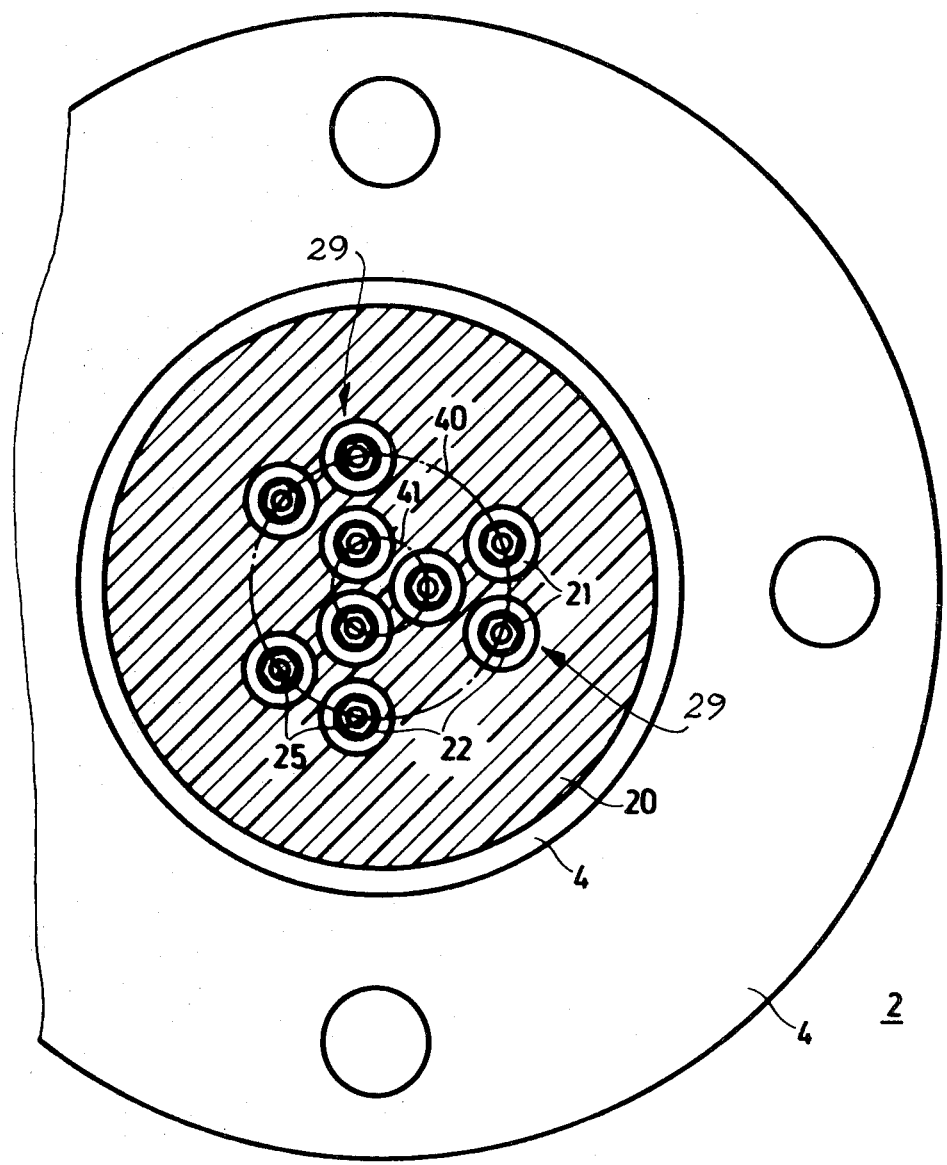
FIG. 2a shows a top view of a plug-in coupling used in the system of FIG. 1.

FIG. 2a is a top view of the plug-in coupling 2. Nine conductive elements 29 consisting of the inner conductor 16, sheath 17, outer conductor 18 and glass wrap 19 are arranged symmetrically in the coupling 2. Six conductive elements 29 are distributed on a first circle 40 and three conductive elements 29 on a second circle 41.

Every three conductive elements 29 are arranged as an equilateral triangle.

A soldering sleeve 22 is glued into the drilled-open end 21 of the glass tape wrap 19. The sleeve is provided with a bore 23 at its underside into which the inner conductor 16 is soldered. The side of the soldering sleeve 22 facing the end 21 of the glass wrap 19 is provided with internal threading to accommodate a contact pin 25.

Figure 3:
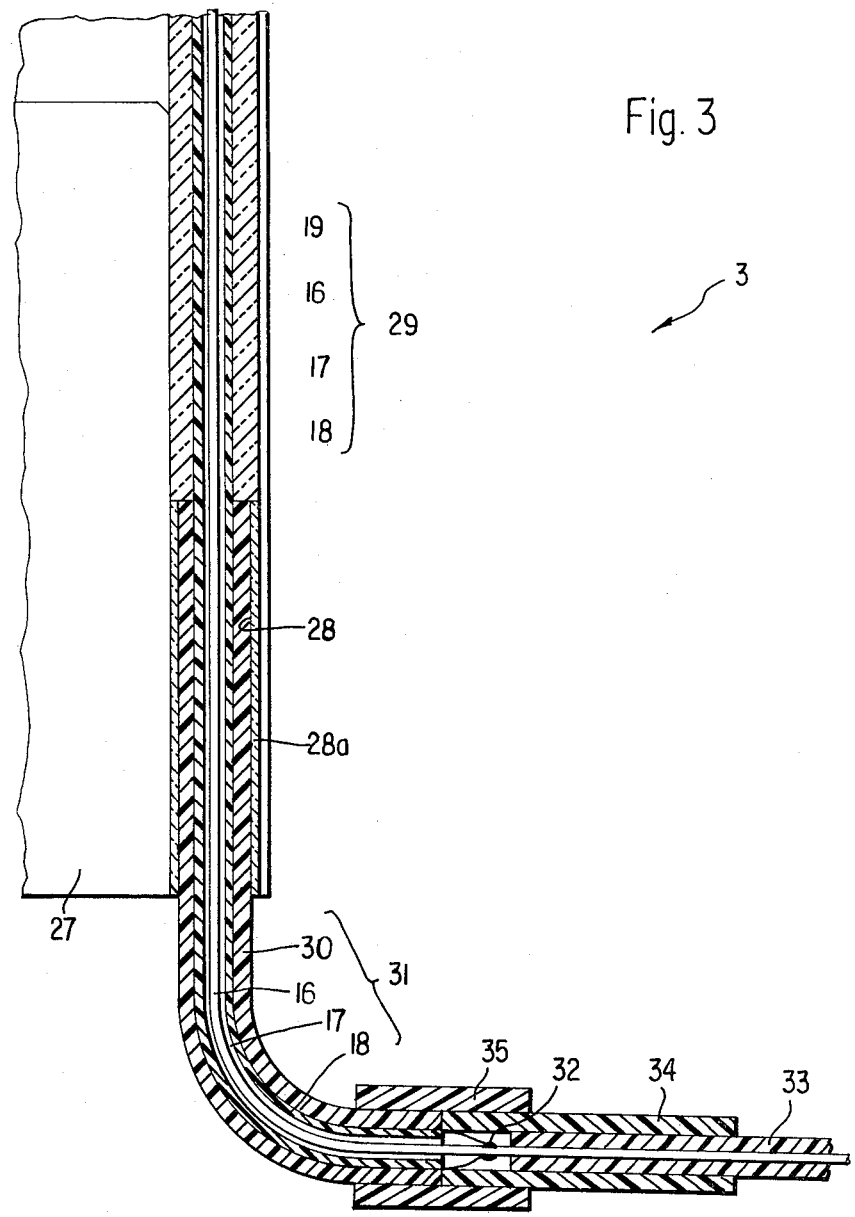
FIG. 3 shows a terminating closure for the system of FIG. 1.

The terminating closure 3 of the high voltage cable 1 is shown in the sectional symmetrical half-view of FIG. 3. A cylindrical insulating body 27 is provided with bores 28 which are distributed over the circular cross section in a predetermined manner and which pass through the insulating body in an axially parallel direction. Each bore accommodates the conductive element 29 consisting of the inner conductor 16, sheath 17, outer conductor 18 and glass wrap 19.

The diameter of the bore 28 is only slightly larger than the outer diameter of the glass wrap 19, the glass wrap 19 providing insulation for the conductive element 29 in approximately the upper half of the insulating body 27. In the lower half of the insulating body 27 within the lower half length of the bore 28, conductive element 29 is encased in a first insulating tube 30 made of polytetrafluoroethylene (PTFE) which has an outer diameter that is smaller than the diameter of the bore 28. The first insulating tube 30 in encased in a cast resin 28a inside the bore 28 of the insulating body 27.

The conductive element 31, which is formed of the inner conductor 16, sheath 17, outer conductor 18 and the first insulating tube 30 is brought out of the bottom of the insulating body 27. The inner conductor 16 and the outer conductor 18 are brought out beyond the ends of the sheath 17 and of the first insulating tube 30 and are electrically conductively connected together by means of a solder connection 32. A high voltage connecting cable 33 has a conductor electrically connected to the solder connection 32 and is joined to the first insulating tube 30 by means of a second insulating tube 34 made of polytetrafluoroethylene (PTFE) and an insulating sleeve 35 made of potytetrafluoroethylene (PTFE). The insulating tube 30 and insulating body 27 are encased in a cast resin 28a.

Figure 4:
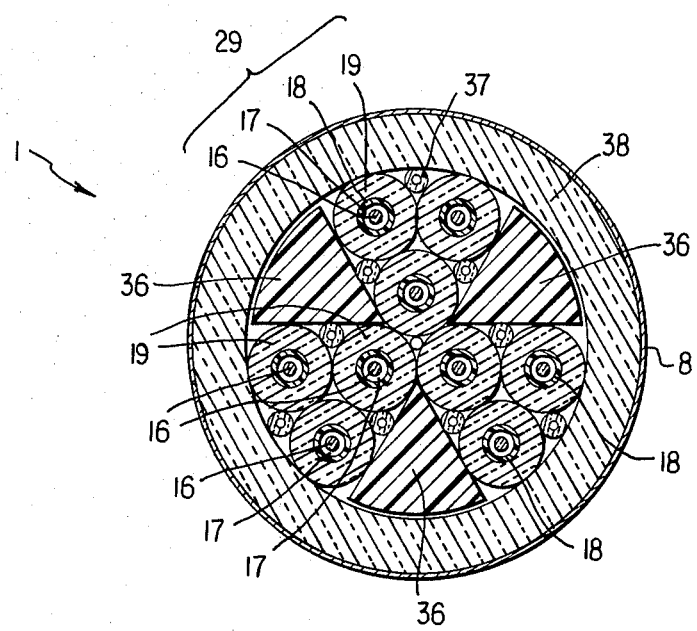
FIG. 4 is a cross section of a cable employed in the system of FIG. 1.

FIG. 4 is a cross-sectional view of the cable 1. Nine identically constructed conductive elements 29, each having an inner conductor 16, sheath 17, outer conductor 18 and glass wrap 19 are arranged symmetrically over the circular cross section of the cable 1. Each group of three conductive elements 29 together forms an equilateral triangle whose apex lies in the center of the cable 1. The interstices between the conductive elements 29 are filled with a glass tape 37 and the interstices between the triangular groups of conductors 29 are filled with glass fiber reinforced plastic filler pieces 36. The arrangement of conductive elements is encased in a second glass tape wrap 38 and a shield 8 applied on the outside over the wrap 38.

In a load test, the measured breakdown voltage from conductor to conductor was 80 kV d.c. and from conductor to shield was 140 kV d.c.

It will be understood that the above description of the present invention is susceptible to various modifications, changes and adaptations and the same are intended to be comprehended within the meaning and range of equivalents of the appended claims.

What is claimed is:

1. A high voltage cable for transmitting current pulses up to 10 kiloamperes at temperatures in the range from 4° K. to 300° K., said cable comprising:
   a plurality of conductive elements distributed symmetrically, in groups, over a circular cross-sectional area, each element including:
      a flexible inner conductor;
      an insulating sheath surrounding said inner conductor, said inner conductor moving freely within said insulating sheath;
      a flexible outer conductor encasing said insulating sheath, the cross-sectional area of said outer conductor being relatively small compared to that of said inner conductor, said inner and outer conductors being electrically conductively connected together; and
   a first glass tape wrap encasing said outer conductor and insulating sheath without the formation of gas bubbles therein;
   glass tape filling the interstices between the conductive elements in each of said groups;
   glass fiber reinforced filler pieces filling the interstices between groups of conductive elements;
   a second glass tape wrap enclosing said groups of conductive elements, and
   a shield enclosing said second glass tape wrap.

2. A high voltage cable and support therefor for transmitting current pulses up to 10 kiloamperes at temperatures in the range from 4° K. to 300° K.,
   said cable comprising at least one conductive element including:
      a flexible inner conductor;
      an insulating sheath surrounding said inner conductor, said inner conductor moving freely within said insulating sheath;
      a flexible outer conductor encasing said insulating sheath, the cross-sectional area of said outer conductor being relatively small compared to that of said inner conductor, said inner and outer conductors being electrically conductively connected together; and
      an insulating jacket encasing said outer conductor and insulating sheath without the formation of gas bubbles within said insulating jacket; and
   said support structure comprising a plug-in coupling including:
      a cast resin block having a plurality of said conductive elements encased therein;
      a soldering sleeve having a threaded opening therein positioned within the bore in said block, said inner conductor being soldered within the opening of said soldering sleeve and said insulating jacket surrounding said sleeve;
      an annular flange enclosing said block; and
      a contact pin threaded into the opening of said soldering sleeve.

3. A high voltage cable and support structure as defined in claim 2 wherein said insulating jacket is a glass tape wrap.

4. A high voltage cable and support structure as defined in claim 2 wherein said support structure includes a terminating closure comprising:
   a cylindrical insulating body having a longitudinal bore therein for accommodating said cable, said insulating jacket consisting of a glass tape wrap extending approximately one-half of the length of the bore in said insulating body and a first insulating tube extending for the remainder of the length of said bore and beyond the end of said cylindrical insulating body, said first insulating tube having a diameter which is less than the diameter of the bore in said insulating body; and a cast resin body for encasing said first insulating tube.

5. A high voltage cable and support structure therefor for transmitting current pulses up to 10 kiloamperes at temperatures in the range from 4° K. to 300° K., said cable comprising at least one conductive element including:

a flexible inner conductor;

an insulating sheath surrounding said inner conductor, said inner conductor moving freely within said insulating sheath;

a flexible outer conductor encasing said insulating sheath, the cross-sectional area of said outer conductor being relatively small compared to that of said inner conductor, said inner and outer conductors being electrically conductively connected together; and an insulating jacket encasing said outer conductor and insulating sheath without the formation of gas bubbles within said insulating jacket; and said support structure comprising a terminating closure including:

a cylindrical insulating body having a longitudinal bore therein for accommodating said cable, said insulating jacket consisting of a glass tape wrap extending to its termination at approximately one-half of the length of the bore in said insulating body and a first insulating tube extending for the remainder of the length of said bore and beyond the end of said cylindrical insulating body, said first insulating tube having a diameter which is less than the diameter of the bore in said insulating body; and a cast resin body for encasing said first insulating tube.

6. A high voltage cable and support structure as defined in claim 5 wherein said inner and outer conductors extend beyond the ends of said insulating sheath and said first insulating tube, said inner and outer conductors being electrically conductively connected together by means of a solder connection.

7. A high voltage cable and support structure as defined in claim 6 which further comprises a high voltage connecting cable having a conductor electrically connected to the solder connection of said inner and outer conductors, a second insulating tube surrounding the conductor of said connecting cable and an insulating sleeve surrounding said first and second insulating tubes and said solder connection.

* * * * *